C. A. PRESTON.
BOTTLE CARRIER.
APPLICATION FILED NOV. 1, 1915.
1,167,430.
Patented Jan. 11, 1916.
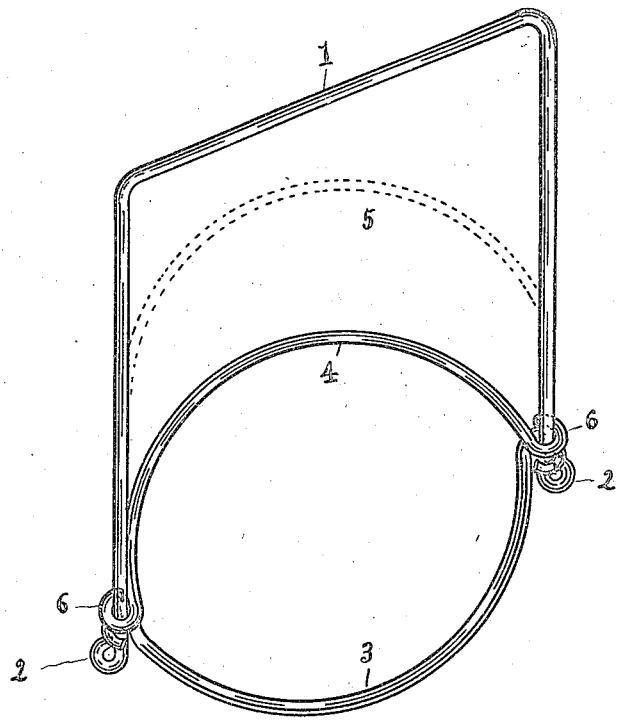
WITNESSES:
Emma A. Murphy
G. T. Tucker
INVENTOR.
Charles A. Preston
BY
W. Stewart Brown ATTORNEYS.

UNITED STATES PATENT OFFICE.

CHARLES A. PRESTON, OF WICHITA, KANSAS.

BOTTLE-CARRIER.

1,167,430.　　　　Specification of Letters Patent.　　Patented Jan. 11, 1916.

Application filed November 1, 1915.  Serial No. 59,063.

*To all whom it may concern:*

Be it known that I, CHARLES A. PRESTON, a resident of Wichita, in the county of Sedgwick and State of Kansas, have invented certain new and useful Improvements in Bottle-Carriers; and I do hereby declare the following to be a full, clear, and exact description of the invention, such as will enable others skilled in the art to which it appertains to make and use the same.

My invention relates to bottle carriers.

The object of the invention is to provide an article of this character which shall be cheap to manufacture, thoroughly efficient in operation, which may be readily applied to and removed from a bottle, and which shall be positive in the prevention of any accidental disconnection between the bottle and the carrier.

With the above and other objects in view, as will appear when the nature of the invention is better understood, the same consists in the novel construction and combination of parts of a bottle carrier as will be hereinafter fully described and claimed.

In the accompanying drawing I have shown a view in perspective of my invention.

Referring to the drawing, 1 denotes a wire bail having eyes 2 turned on its free ends.

3 and 4 are curved loops having eyes 6—6, which are slidably positioned on the bail; these loops are formed to encircle the neck of various sized bottles.

When it is desired to place the carrier on a bottle it is only necessary to slide the loop 4 up on the bail as indicated by the dotted lines 5, and insert the neck of the bottle in between the said loops, and then slide the loop 4 down to its normal position and the loops will be beneath the rim of the neck of the bottle, which make it positive against release.

When it is desired to remove the carrier from the bottle, the bail 1 is pushed down and the loop 3 will follow it while the loop 4 can be held up and the said loops are spread apart again as indicated by the dotted line 4.

It will thus be seen that I have produced a simple and efficient device, one which is easily applied and removed.

What I claim is:—

In a bottle carrier a bail having eyes on its free ends, curved loops having eyes on their free ends and slidably positioned on the said bail as specified.

In testimony whereof, I have signed this specification in the presence of two subscribing witnesses.

CHARLES A. PRESTON.

Witnesses:
　B. WARNOCK,
　ARTHUR E. DEMAREE.